Nov. 24, 1931.   R. J. OLANDER   1,832,944
HAND BRAKE
Filed Jan. 27, 1930
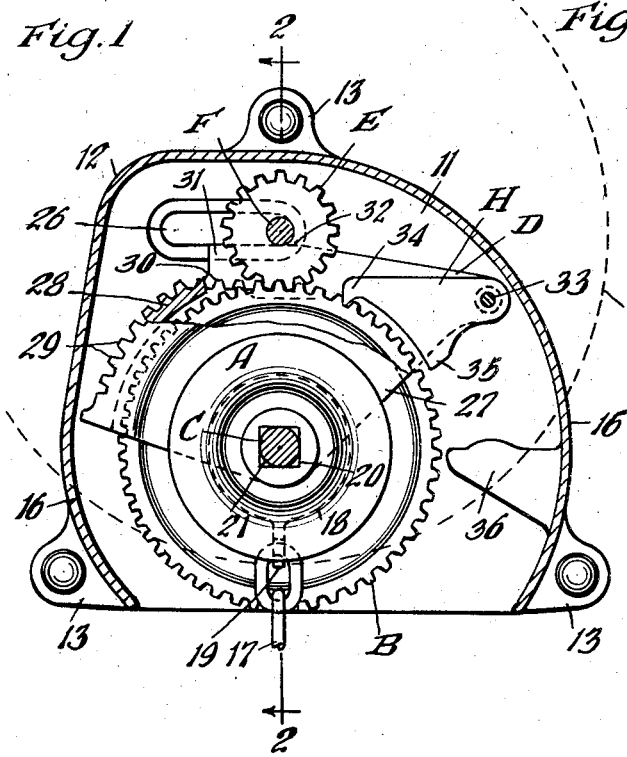
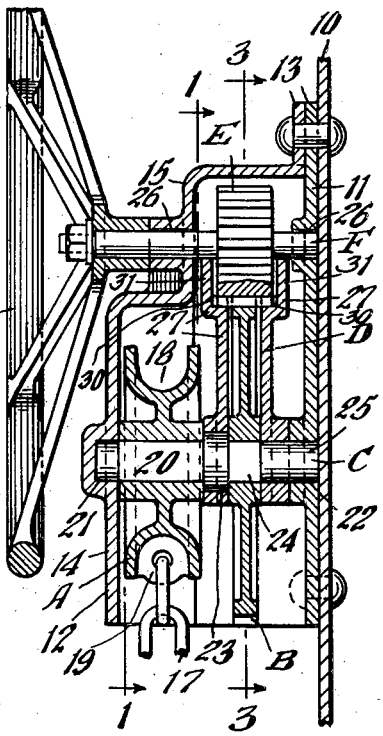
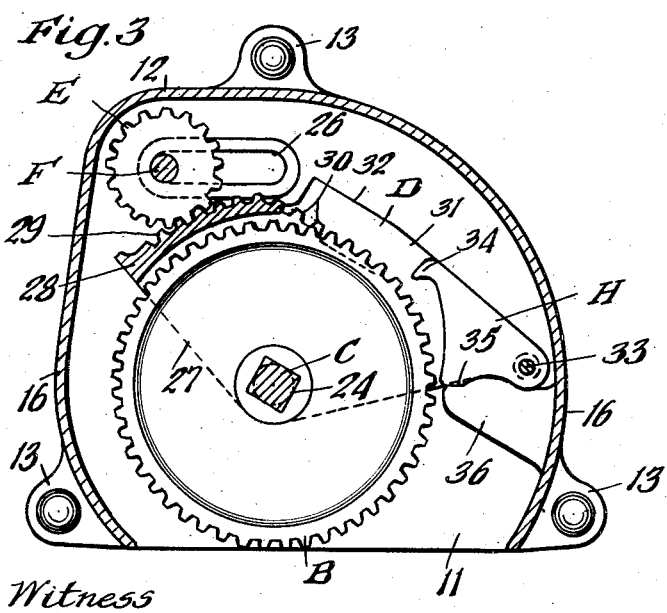
Inventor
Roland J. Olander
Witness
Wm. Geiger
By Joseph Harris
his Atty.

Patented Nov. 24, 1931

1,832,944

UNITED STATES PATENT OFFICE

ROLAND J. OLANDER, OF CHICAGO, ILLINOIS, ASSIGNOR TO W. H. MINER, INC., OF CHICAGO, ILLINOIS, A CORPORATION OF DELAWARE

HAND BRAKE

Application filed January 27, 1930. Serial No. 423,574.

This invention relates to improvements in hand brakes.

One object of the invention is to provide a hand brake mechanism for railway cars, including a rotary chain tightening element, driving means for said element, means for locking said tightening element against rotation in an unwinding direction and manually operated means for actuating the driving means for rotating the tightening element to wind the brake chain thereon, wherein release of the brakes is controlled by said manually operated means by rendering said locking means inoperative. and the manually operated means is employed to automatically effect partial release of the brakes prior to unlocking of said locking means.

A further object of the invention is to provide a hand brake mechanism including a rotary chain winding element, drive means for said element, a manually operated rotary member for actuating said drive means to rotate the winding drum, and releasable locking means for preventing retrograde rotation of the winding drum, wherein the locking means is actuated by the manually operated member to effect release of the same, and includes mechanism for maintaining operative relation between the manually operated means and the winding drum, to effect partial release of said brake mechanism, and also retightening of the same within control of the operator, without effecting full release of the brakes.

A still further object of the invention is to provide a hand brake mechanism for railway cars including a chain winding drum, a drive gear member operatively connected to the drum, wherein a single manually operated means is provided for both actuating the brakes and controlling release of the same, said last named means including a rotatable pinion member movable into and out of engagement with the gear member. movable rack means cooperating with said pinion member, releasable means controlled by said pinion for holding said rack stationary for a predetermined period, while cooperating with the pinion to effect movement of the same toward and away from said gear member to mesh and unmesh said members, and means operatively connecting said rack to said chain winding drum to effect rotation thereof in reverse directions when said holding means is released, the connecting means including a releasable locking dog operative for preventing retrograde rotation of the winding drum when said rack is held stationary, and while the pinion is in driving relation with the gear while the chain is being tightened.

Other objects of the invention will more clearly appear from the description and claims hereinafter following.

In the drawings, forming a part of this specification, Figure 1 is a vertical, sectional view on line 1—1 of Figure 2 of my improved hand brake mechanism. illustrating the same as applied to the end wall of a car, the section being in a plane parallel to said end wall. Figure 2 is a vertical, sectional view, substantially in a plane at right angles to the plane of the sectional view in Figure 1 and corresponding to line 2—2 of said figure. Figure 3 is a sectional view on line 3—3 of Figure 2 similar to Figure 1 but showing the parts in a different operating position.

My improved hand brake mechanism is preferably so designed as to be mounted on the vertical end wall of a railway car, said end wall being designated by 10 in the drawings. In carrying out my invention, I provide a two part housing within which the operating parts of the brake mechanism are enclosed. The two part housing is composed of a plate member 11 mounted on the end wall of the car and a cover section 12 secured to the plate member. The plate member 11 is provided with three securing lugs 13—13 and the cover member 12 is provided with three corresponding securing lugs which register with the lugs 13 and are also indicated by 13. The two parts of the housing are preferably secured together by rivets which extend through the lugs 13—13 thereof. As shown in the drawings, the rivets which secure the parts of the housing together also pass through the end wall 10 of the car and serve to fix the housing to the car.

The cover member 12 has an outer vertical wall 14 which is disposed parallel to the plate 11 and spaced therefrom so as to accommodate certain parts of the brake mechanism therebetween. At the upper portion, the cover member 12 is reduced in size as clearly shown in Figure 2, the outer wall being offset inwardly, thereby providing a relatively short, vertical wall section 15. The cover member is also provided with a side wall 16 formed integral with the walls 14 and 15 and extending along opposite sides and the top of the housing. The housing is left open at the bottom, as clearly shown in Figures 1 and 2, to accommodate the brake chain.

My improved brake mechanism cooperates with the usual brake chain 17, which is connected to the brake mechanism proper of the railway car, not shown.

My improved brake mechanism proper comprises broadly a chain winding drum A, a driving gear B, a supporting shaft C, an oscillating carrier D, a driving pinion E, a drive shaft F, a hand wheel G and a pivoted locking dog H.

The chain winding drum A is provided with the usual peripheral groove 18 adapted to receive the brake chain 17 when wound thereon. The chain 17 is secured to the winding drum by means of a web member 19 within the groove 18 and formed integral with the drum, the web being provided with a perforation adapted to receive the end link of the chain. The drum A is mounted on the shaft C, the shaft being provided with a square section 20 adapted to fit the opening in the hub of the drum, which opening is of corresponding square cross section. The shaft C is rotatably supported at the front and rear ends in bearing openings or seats 21 and 22 provided in the front and rear walls of the housing respectively. Adjacent the winding drum and inwardly thereof the shaft C is provided with an enlarged cylindrical bearing portion 23 for a purpose hereinafter pointed out. Adjacent the cylindrical bearing portion, the shaft is of reduced size and of square cross section, this portion of the shaft corresponding in size to the portion 20 and being designated by 24. Rearwardly of the square section 24, the shaft is of cylindrical form, as indicated by 25, and of a diameter corresponding to the outer end of the same, the inner end portion of said cylindrical section being journaled in the opening 22 of the plate 11. As will be seen upon reference to Figure 2, the bearing opening 22 is reinforced by a flange surrounding the same, said flange forming an inwardly projecting boss member. This flange is spaced from the square section 24 of the shaft C, thereby providing a bearing portion on said shaft between the boss and said square portion.

The driving gear B is secured to the shaft C, being mounted on the square portion 24 thereof, the hub of the gear B having an opening of square cross section fitting said portion 24. As will be evident, the drum A and the gear B, both being fixed to the shaft C, are rotatable in unison.

The driving pinion E is mounted in the reduced upper portion of the housing and is fixed to the operating shaft F, which has its opposite ends supported in the front and rear walls of the housing. The shaft F is so supported that it is movable in a lateral direction in a horizontal plane in addition to being rotatable about its axis. The front and rear walls 15 and 11 of the housing are provided with alined horizontally disposed guide slots 26—26 through which the shaft F extends. The guide slots are reinforced by outstanding flanges, as shown in Figure 2, and are of such a width as to substantially fit the shaft F, thereby preventing movement of the shaft in a vertical direction. As shown in Figure 1, the guide slots 26—26 are located to one side of a vertical plane extending through the axis of rotation of the shaft C, which supports the chain winding drum and the gear B. The inner end walls of the guide slots 26—26 are so disposed that when the shaft F abuts said walls, as shown in Figure 1, the teeth of the pinion E will fully mesh with the teeth of the gear B. The hand wheel G is secured to the outer end of the shaft F in any suitable manner, being preferably keyed to the same and held in position by the usual securing nut at the outer end of the shaft.

The carrier D comprises two members 27—27 joined at their upper sides by a connecting portion 28. The two members 27 are disposed on opposite sides of the gear B, one of said members being journaled on the cylindrical portion 23 of the shaft C and the other being journaled on the cylindrical portion 25 between the gear B and the boss surrounding the opening 22 of the plate 11. The carrier D is thus rotatably supported on the shaft C for movement independent of the latter. The connecting section 28 of the carrier D is provided with a plurality of gear teeth 29—29 which are arranged concentric to the teeth of the gear B but disposed at a greater distance from the axis of the shaft C than the teeth of the gear B. At the upper side, the carrier D is provided with a pair of horizontally disposed rack members 30—30, the teeth of said rack members being in transverse alinement and being so disposed that they will mesh with the pinion E, the pinion being of such a width, as shown in Figure 2, as to engage the gear B and also overlap the two rack members 30—30. As shown in Figure 1, the rack members 30—30 are substantially tangent to the gear B and merge with the gear teeth 29 of the carrier D. The rack teeth 30 are so arranged, and the racks are of such a length that the innermost teeth of said rack members will clear the pinion E when the parts are in the position shown in Figure 1. As will be evident, when the parts are in this position, the pinion F may be freely rotated in a clockwise direction, as viewed in Figure 1, without danger of engagement with the teeth of the racks 30.

The two sections 27—27 of the carrier D are provided with upstanding wall portions 31—31 at the upper ends thereof which embrace the pinion E. The walls 31—31 have straight sections 32—32 which are horizontally disposed, when the parts are in the position shown in Figure 1, and are in substantial alinement with the bottom walls of the guide slots 26—26. As clearly shown in Figure 1, the walls 31—31 extend a considerable distance to the left of the position of the shaft F. As will be evident, by engagement of the wall members 31—31 with the shaft F, the carrier D is locked against rotation in a clockwise direction, as viewed in Figure 1. The upstanding walls 31—31 also project to the right of the carrier, as viewed in Figure 1, and the locking dog H is pivotally supported on these walls by means of a transversely extending pivot pin 33 at the outer end of the dog. At the inner end, the dog is provided with a tooth 34 which cooperates with the teeth of the gear B, the teeth being so formed as to hold said gear against rotation in a direction corresponding to the unwinding direction of the winding drum A. The dog H is provided with a depending portion 35, which is adapted to cooperate with a stop member 36 projecting inwardly from the side wall of the cover member of the housing and preferably formed integral therewith.

The operation of my improved hand brake mechanism is as follows: Assuming the parts in the position shown in Figures 1 and 2, the brakes are tightened by rotation of the hand wheel G in a clockwise direction. Rotation of said hand wheel G in a clockwise direction effects rotation of the pinion E in a similar direction and the pinion in turn effects rotation of the gear B in a contra-clockwise direction, rotating the shaft C therewith and effecting rotation of the chain winding drum A in a similar direction, thereby winding the chain thereon. It will be clear that rotation of the pinion while in engagement with the teeth of the gear B, while the chain is being wound on the drum, will cause the shaft F to hug the end walls at the righthand sides of the guide slots 26—26, as viewed in Figure 1, thereby maintaining said pinion clear of the teeth of the rack members 30—30. During the chain winding operation, the drum will be held against retrograde rotation by the locking dog H which engages the teeth of the gear B, the carrier D on which the locking dog is pivoted being held in fixed position at this time by engagement of the wall portions 32 thereof with the shaft F.

To release the brakes, the hand wheel G is rotated in a contra-clockwise direction, as viewed in Figure 1. Rotation of the hand wheel in this direction will effect similar movement of the pinion E. Inasmuch as the pinion E is in mesh with the teeth of the gear B, which is held against rotation in a clockwise direction by the locking dog H, the gear E will be forced to travel bodily to the left, as viewed in Figure 1, the same being guided by the slots 26—26 with which the shaft F engages. As the pinion travels to the left, the same will engage the rack members 30—30, thereby causing still further movement to the left of said pinion. As the shaft F approaches the outer ends of the guide slots 26—26, the same will clear the outer end portions of the walls 32—32 of the carrier D, thereby permitting the carrier to swing about the axis of the shaft C. The pull of the brake chain, which has been wound on the drum, will tend to rotate the gear B in a clockwise direction, as viewed in Figure 1. Inasmuch as the locking dog H is in operative engagement with the teeth of the gear B, the carrier D will be moved in a similar direction, thereby tending to rotate the pinion E, the latter at this time engaging the gear teeth 29—29 of the carrier. The operator in gripping the hand wheel has full control of this movement of the carrier and may permit partial or complete release of the brakes as desired. To completely release the brakes, the operator controlling the hand wheel G permits the carrier D to move to such an extent that the locking dog H comes into engagement with the trip member 36, the latter engaging with the portion 35 of the dog and causing the same to be swung away from the gear B, thereby disengaging the tooth 34 from the teeth of the gear and permitting free rotation of the gear B and free running of the chain winding drum A, thus fully releasing the brakes. This position of the parts is shown in Figure 3.

Assuming that the operator desires to partially release the brakes only, the carrier is permitted to oscillate to such an extent only that the trip member 36 will not be engaged by the dog H. The brakeman may then reapply the brakes, if desired, by rotating the hand wheel G in a clockwise direction, as viewed in Figure 1, thereby rotating the carrier D in a contra-clockwise direction and the latter through the locking dog H, operating the gear B in a similar direction and effecting winding of the chain on the drum A.

Assuming that the parts of the brake mechanism are left in the condition shown in Figure 3 after full release of the brakes, all that is necessary for the brakeman to do to restore the parts of the mechanism to operative position is to rotate the hand wheel G in a clockwise direction, as viewed in Figure 1. This rotation of the hand wheel will effect a similar rotation of the pinion E, which at this time is in mesh with the gear teeth 29—29 of the carrier D. Rotation of the pinion will oscillate the carrier D, thereby disengaging the locking dog H from the trip member 36 and re-engaging the same with the teeth of the gear B. Oscillation of the carrier will continue until the teeth of the pinion E come into engagement with the teeth of the rack members 30. The pinion E will then be forced to travel to the right, as viewed in Figure 3, and the shaft F will be engaged over the wall portions 32—32 of the carrier, thereby locking the latter against rotation and holding the dog H in operative position to prevent rotation of the gear B in a direction corresponding to unwinding movement of the chain winding drum. The pinion E will travel to the right, as viewed in Figure 3, until it leaves the racks and engages the teeth of the gear B, at which time movement of the gear E to the right is limited by engagement of the shaft F with the end walls at the right hand sides of the slots 26. The parts will then be in substantially the position shown in Figure 1, and the chain winding operation is performed in the manner hereinbefore described.

From the preceding description taken in connection with the drawings, it will be evident that I have provided an exceedingly simple and efficient hand brake mechanism wherein the attention of the brakeman is required only in operating the hand wheel of the brakes, the hand wheel controlling all of the operations necessary in tightening and releasing the brakes. It is further pointed out that the operating member of my improved hand brake mechanism provides for tightening the brakes after partial release of the same by simple manipulation of the hand wheel, and also provides for full release of the brakes, with free running of the chain winding drum by proper manipulation of said hand wheel. Inasmuch as the diameter of the gear portion of the carrier is greater than the diameter of the driving gear through which the chain winding operation is effected, the retightening of the brakes after partial release is effected under greater leverage than the chain winding operation.

I have herein shown and described what I now consider the preferred manner of carrying out my invention, but the same is merely illustrative and I contemplate all changes and modifications that come within the scope of the claims appended hereto.

I claim:

1. In a hand brake mechanism for railway cars, the combination with a rotary chain winding element; a rotary driving member in constant driving engagement with said winding element; manually actuated rotary means for directly operating said driving member to actuate the winding element in chain winding direction; a second driving member; and connecting means between said first and second driving members locking said members against relative rotation in one direction while permitting relative movement thereof in a reverse direction, said rotary means being operatively engageable with either said first or second named driving member to actuate the winding element.

2. In a hand brake mechanism for railway cars, the combination with a chain winding element; of a driving member fixed thereto; a second driving member rotatable with respect to said winding element and first named driving member; ratchet means connecting said first and second named driving members; and a manually actuated rotary operating element engageable with either of said driving members to actuate said winding element in chain winding direction.

3. In a hand brake mechanism for railway cars, the combination with a chain winding element; of a driving member fixed thereto; a second driving member rotatable with respect to said winding element and first named driving member; ratchet means connecting said first and second named driving members; a manually actuated rotary operating element engageable with either of said driving members to actuate said winding element in chain winding direction; and means for locking said second named driving member against rotation while said manually actuated operating element is in driving engagement with said first named driving member whereby said ratchet means is rendered operative to hold the winding element against retrograde rotation.

4. In a hand brake mechanism for railway cars, the combination with a rotary chain winding element; of a rotary driving member connected to said winding element; means for preventing retrograde rotation of said driving member and chain winding element, said means being mounted on a movable support; a manually actuated operating means rotatable in reverse directions and engageable with said rotary driving member to directly actuate the latter, and when rotated in one direction rotating the winding element in a chain winding direction, and when rotated in a reverse direction causing said operating member to move relative to said driving member; cooperating locking means on said operating means and said support for holding the latter against movement while the operating means and driving member are in operative engagement; cooperating means on said support and operating means operative when said last named means is rotated in said reverse direction for moving the same away from and out of operative engagement with said driving member, said movement of the operating means unlocking said locking means to allow movement of said support; means on said support for connecting the same to said operating element to operate in unison therewith when said operating element is rotated in either direction; and means in the path of movement of said means for preventing retrograde rotation of the driving member for releasing the same to permit free running of the winding element and release of the brakes.

5. In a hand brake mechanism for railway cars, the combination with a rotary chain winding element; of a rotary driving member connected to said winding element; locking means for preventing retrograde rotation of said winding element; a manually actuated operating means movable toward and away from said driving member and rotatable in reverse directions, and engageable with said driving member to directly actuate the latter, and when rotated in one direction rotating the chain winding element in chain winding direction, reverse rotation of said operating means effecting bodily displacement thereof away from said driving member; oscillatable means normally held against movement cooperating with said operating means upon further rotation thereof in said last named direction to completely disengage the same from said driving member, said oscillatable means when released being actuated by said operating member to release said locking means.

6. In a hand brake mechanism for railway cars, the combination with a rotary chain winding element; of a rotary driving member connected to said winding element; a manually actuated operating means movable toward and away from said driving member, rotatable in reverse directions and engageable with said driving member to directly actuate the latter, and when rotated in one direction rotating the chain winding element in chain winding direction, reverse rotation of said operating means effecting disengagement thereof from said driving member; and movable carrier means operatively engaged by said operating means after disengagement from said driving member and rotatable in reverse directions by said operating means; and means for connecting said movable means and driving member for rotating the latter through the former in chain winding direction only.

7. In a hand brake mechanism for railway cars, the combination with a rotary chain winding element; of a rotary driving member connected to said winding element; a manually actuated operating means movable toward and away from said driving member, rotatable in reverse directions and engageable with said driving member to directly actuate the latter, and when rotated in one direction rotating the chain winding element in chain winding direction, reverse rotation of said operating means effecting disengagement thereof from said driving member; an oscillating carrier operatively engaged by said operating means after the same has been disengaged from the driving member and oscillatable in reverse directions through corresponding rotation of said operating means; and a locking member on said carrier cooperating with the driving member for preventing relative rotation of said carrier and driving member in a direction corresponding to the unwinding direction of the chain winding drum; and means controlled by the operating means for unlocking said locking member to permit free running of the chain winding drum and release of the brakes.

8. In a hand brake mechanism for railway cars, the combination with a rotary chain winding element; of a rotary driving member connected to said winding element; a manually actuated rotary operating means; guide means for guiding said operating means into and out of engagement with said rotary driving means; a locking dog; an oscillating carrier on which said dog is mounted; means on said carrier cooperating with the operating means when in engagement with said driving member for locking the carrier to hold the dog in locking relation with the winding member; and means on said carrier cooperating with said operating means for moving the same out of engagement with the driving member and out of holding relation to the carrier when said operating means is rotated in a direction reverse to the direction of rotation thereof in effecting winding of the chain, thereby producing oscillation of the carrier in a direction to move said dog in a direction to allow unwinding movement of the winding member; and a trip engaged by said dog when the carrier is so oscillated to release the dog from holding relation with said winding means and allow free running of the winding means and full release of the brakes.

9. In a hand brake mechanism for railway cars, the combination with a rotary chain winding drum; of a driving gear fixed to the drum; a carrier mounted for oscillation about the axis of rotation of said gear; a pinion adapted to mesh with said gear; a manually actuated operating member to which said pinion is fixed; means for guiding said operating member toward and away from said gear to respectively engage the same therewith and disengage the same therefrom; gear teeth on said carrier engageable with said pinion to effect movement of the pinion out of operative relation with respect to said gear; additional teeth on said carrier engaged by said pinion for oscillating the carrier in a reverse direction; a locking dog on said carrier cooperating with the gear to effect rotation of the gear in a chain winding direction when the carrier is oscillated in one direction, and effecting movement of the carrier with said gear when the latter rotated in a direction to allow unwinding of the chain; trip means engaged by the locking dog when said carrier is moved in the last named direction for releasing the dog to allow free running of the chain winding drum; and cooperating means on the carrier and operating member for locking the carrier against movement when said pinion is in operating relation to the gear member, thereby holding the dog in operative relation to prevent retrograde rotation of the chain winding drum.

10. In a hand brake mechanism for railway cars, the combination with rotary means for tightening the brakes; of a manually actuated rotary operating member, said operating member being movable into and out of driving relation with the tightening means; means for preventing retrograde rotation of the chain tightening means; and means actuated by said operating member when disengaged from the driving member for releasing said means for preventing retrograde rotation, said last named means including means for transmitting motion from said operating member, when rotated respectively in opposite directions, to said chain tightening means to rotate the same respectively in chain winding and unwinding directions.

11. In a hand brake mechanism for railway cars, the combination with a rotary chain tightening element; of driving means for said element; manually actuated means for operating said driving means to tighten the brakes; means cooperable with said manually actuated means for effecting partial release of the brakes; and means effecting disengagement of the manually actuated means and the tightening means when the former is rotated in a direction reverse to the rotation thereof in tightening the brakes and effecting engagement between the manually actuated means and said means for effecting partial release of the brakes to operate the latter.

12. In a hand brake mechanism for railway cars, the combination with a rotary chain tightening element; of driving means for said element; manually actuated means for operating said driving means to tighten the brakes; means cooperable with said manually actuated means for effecting partial release of the brakes; and means effecting disengagement of the manually actuated means and the tightening means when the former is rotated in a direction reverse to the rotation thereof in tightening the brakes and effecting engagement between the manually actuated means and said means for effecting partial release of the brakes to operate the latter, said means for effecting partial release including a locking member operatively connecting said last named means to the tightening element to cause said means for effecting partial release to rotate with said tightening element in chain unwinding direction but permitting rotation of the tightening member with respect to the means for effecting partial release in a reverse direction.

13. In a hand brake mechanism for railway cars, the combination with a rotary chain tightening element; of driving means for said element; manually actuated means for operating said driving means to tighten the brakes; means cooperable with said manually actuated means for effecting partial release of the brakes; means effecting disengagement of the manually actuated means and the tightening means when the former is rotated in a direction reverse to the rotation thereof in tightening the brakes and effecting engagement between the manually actuated means and said means for effecting partial release of the brakes to operate the latter, said means for effecting partial release including a locking member operatively connecting said last named means to the tightening element to cause said means for effecting partial release to rotate with said tightening element in chain unwinding direction but permitting rotation of the tightening member with respect to the means for effecting partial release in a reverse direction; and releasable means for holding said means for effecting partial release against movement to hold said locking member operatively engaged with respect to the winding element to prevent retrograde rotation of the winding element.

14. In a hand brake mechanism for railway cars, the combination with a rotary chain tightening element; of driving means for said element; manually actuated means for operating said driving means to tighten the brakes; means cooperable with said manually actuated means for effecting partial release of the brakes; means effecting disengagement of the manually actuated means and the tightening means when the former is rotated in a direction reverse to the rotation thereof in tightening the brakes and effecting engagement between the manually actuated means and said means for effecting partial release of the brakes to operate the latter, said means for effecting partial release including a locking member operatively connecting said last named means to the tightening element to cause said means for effecting partial release to rotate with said tightening element in chain unwinding direction but permitting rotation of the tightening member with respect to the means for effecting partial release in a reverse direction; and stop means engaged by said locking member when said partial release mechanism is operated to a predetermined extent for tripping said locking member to release the same and permit free running of the tightening element.

15. In a hand brake mechanism for railway cars, the combination with a rotary chain winding drum; of a driving gear operatively connected to the drum; a manually actuated rotary pinion movable toward and away from said driving gear to engage the same therewith and disengage the same therefrom; stop means for limiting movement of said pinion toward said driving gear and maintaining the same operatively engaged therewith; a pivoted carrier having gear teeth thereon adapted to cooperate with said pinion for effecting movement of the latter toward and away from said driving gear, when said manually actuated pinion is rotated in chain winding and unwinding directions respectively; and releasable means on the carrier for operatively connecting the carrier and drum for rotating in unison.

In witness that I claim the foregoing I have hereunto subscribed my name this 25th day of January, 1930.

ROLAND J. OLANDER.